(12) United States Patent
Chi et al.

(10) Patent No.: US 9,557,867 B2
(45) Date of Patent: Jan. 31, 2017

(54) TOUCH PANEL AND MANUFACTURING PROCESS THEREOF

(71) Applicant: TPK Touch Solutions (Xiamen) Inc., Xiamen (CN)

(72) Inventors: Ho-Hsun Chi, Hsinchu (TW); Yau-Chen Jiang, Hsinchu (TW); Defa Wu, Jinjiang (CN); Bin Lai, Fuzhou (CN)

(73) Assignee: TPK Touch Solutions (XIAMEN) Inc., Xiamen (CN)

( * ) Notice: Subject to any disclaimer, the term of this patent is extended or adjusted under 35 U.S.C. 154(b) by 112 days.

(21) Appl. No.: 14/483,130

(22) Filed: Sep. 10, 2014

(65) Prior Publication Data

US 2015/0068883 A1 Mar. 12, 2015

(30) Foreign Application Priority Data

Sep. 10, 2013 (CN) .......................... 2013 1 0409434

(51) Int. Cl.
*G06F 3/045* (2006.01)
*G06F 3/044* (2006.01)

(52) U.S. Cl.
CPC ..... *G06F 3/044* (2013.01); *G06F 2203/04103* (2013.01); *G06F 2203/04111* (2013.01); *Y10T 29/49105* (2015.01)

(58) Field of Classification Search
USPC ........................................................ 200/600
See application file for complete search history.

(56) References Cited

U.S. PATENT DOCUMENTS

| 2012/0044191 A1* | 2/2012 | Shin ................. G06F 3/044 345/174 |
| 2012/0127099 A1* | 5/2012 | Liu .................. G06F 3/044 345/173 |

FOREIGN PATENT DOCUMENTS

CN 101441545 * 5/2009

* cited by examiner

*Primary Examiner* — Renee Luebke
*Assistant Examiner* — Ahmed Saeed

(57) ABSTRACT

A touch panel includes a plurality of first electrodes arranged along a first direction and parallel to each other, wherein each first electrode includes a plurality of first electrode blocks and a plurality of first connection traces. A plurality of second electrodes arranged along a second direction and parallel to each other, wherein each second electrode includes a plurality of second electrode blocks and a plurality of second connection traces. And a plurality of insulating blocks, wherein each insulating block includes a main portion and at least one extending portion, the main portion is disposed between each first connection trace and each second connection trace, the extending portion extends from the main portion to the space between the first electrode block and the second electrode block. The present invention further provides a method for forming the touch panel mentioned above.

19 Claims, 4 Drawing Sheets

TOUCH PANEL AND MANUFACTURING PROCESS THEREOF

BACKGROUND OF THE INVENTION

This Application claims priority of the People's Republic of China Patent Application No. CN201310409434.2, filed on Sep. 10, 2013, the entirety of which is incorporated by reference herein.

FIELD OF THE INVENTION

The present invention relates to the touch sensing technology field, and more specifically, to a touch panel and the manufacturing method thereof.

DESCRIPTION OF THE PRIOR ART

Nowadays, personal digital assistants (PDA), mobile phones, notebook computers, tablet PCs and other portable electronic products are wildly used in modern life, and touch panels are usually used as the interface display of those electronic products mentioned above. Since these electronic products need to be thinner and lighter, the traditional input devices, such as keyboards or mice have to be replaced with other input devices. In addition, the needs for humanized tablet PCs has greatly increased, hence the touch panel technology has become one of the key components in electronic products.

In the conventional process for forming a touch panel, firstly, a plurality of first electrodes are formed on the substrate, arranged along a first direction and parallel to each other, a plurality of second electrodes are also formed on the substrate, arranged along a second directions and parallel to each other. There are some spaces existing between each first electrode and the adjacent second electrodes, a plurality of insulating blocks are formed, each insulating block is disposed on the cross intersection of the first electrodes and the second electrodes, to electrically isolate them from each other. Capacitance exists between the first electrodes and the second electrodes, when the touch panel is touched (such as by a finger), the capacitance at the touched point will be changed, therefore, the touched point can be detected according to the changing of the capacitance, and some data can be acquired.

During the manufacturing process for forming a touch panel, the edges of the insulating block disposed at the cross intersection of the first electrodes and the second electrodes is easily partially flaked caused by some force damages from outside, especially, the force damages from the spaces' position direction being stronger. If the insulating block is flaked, that will cause the first electrode and the second electrode to be shorted with each other, and influence the performance of the touch panel.

BRIEF SUMMARY OF THE INVENTION

To resolve the issue mentioned above, the present invention provides a touch panel with insulating blocks that can avoid the flaking problems. And further provides a method for forming the touch panel.

The present invention provides a touch panel, comprising a plurality of first electrodes arranged along a first direction and parallel to each other, wherein each first electrode includes a plurality of first electrode blocks and a plurality of first connection traces, each first connection trace electrically connecting to two adjacent first electrode blocks along the first direction; a plurality of second electrodes arranged along a second direction and parallel to each other, wherein each second electrode includes a plurality of second electrode blocks and a plurality of second connection traces electrically connected to two adjacent second electrode blocks along the second direction, a space is formed between each second electrode block and the adjacent first electrode blocks, and each second connection trace crosses the first connection trace; and a plurality of insulating blocks, wherein each insulating block includes a main portion and at least one extending portion, the main portion is disposed between each first connection trace and each second connection trace, to electrically isolate the first connection trace and the second connection trace from each other, and the extending portion extends from the main portion to the space between the first electrode block and the adjacent second electrode blocks.

The present invention further provides a method for forming a touch panel, at least comprising the following steps: first, a plurality of first electrode blocks arranged along a first direction are formed, a plurality of first connection traces electrically connecting to two adjacent first electrode blocks along the first direction, and a plurality of second electrode blocks arranged along a second direction, wherein the first electrode blocks and the first connection traces compose a plurality of first electrodes, and a space is formed between each second electrode block and the adjacent first electrode blocks; next, a plurality of insulating blocks are formed, wherein each insulating block includes a main portion and at least one extending portion, the main portion is disposed on each first connection trace, the extending portion extends from the main portion to the space between the first electrode block and the adjacent second electrode blocks; afterwards, a plurality of second connection traces are formed on the insulating blocks and electrically connected to two adjacent second electrode blocks along the second direction, wherein the second electrode blocks and the second connection traces compose a plurality of second electrodes.

One feature of the present invention is that the insulating block comprises a main portion and at least one extending portion, the extending portion extends from the main portion to the space between the first electrode block and the adjacent second electrode blocks. Therefore, even though the edges of each insulating block is flaked caused by the force damages from outside, the insulating block can still electrically isolate the first electrodes from the second electrodes, thereby preventing the shorting problems between electrodes in different axes.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

To provide a better understanding of the present invention to users skilled in the technology of the present invention, preferred embodiments are detailed as follows. The preferred embodiments of the present invention are illustrated in the accompanying drawings with numbered elements to clarify the contents and effects to be achieved.

Please note that the figures are only for illustration and the figures cannot be to scale. The scale can be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Figure 1:
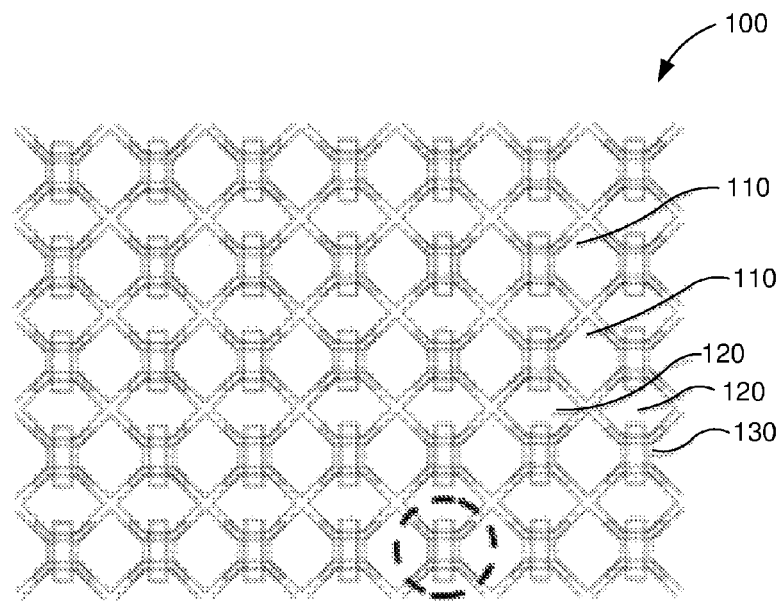
FIG. 1 is a top view diagram showing the touch panel according to a first preferred embodiment of the present invention.

FIG. 1 is a top view diagram showing the touch panel according to a first embodiment of the present invention. As shown in FIG. 1, A touch panel 100 comprises a plurality of first electrodes 110 arranged along a first direction (such as X-axis) and parallel to each other, a plurality of second electrodes 120 arranged along a second direction (such as Y-axis) and parallel to each other, and a plurality of insulating blocks 130. The first direction is not parallel to the second direction. Preferably, the first direction and the second direction are orthogonal.

Figure 2:
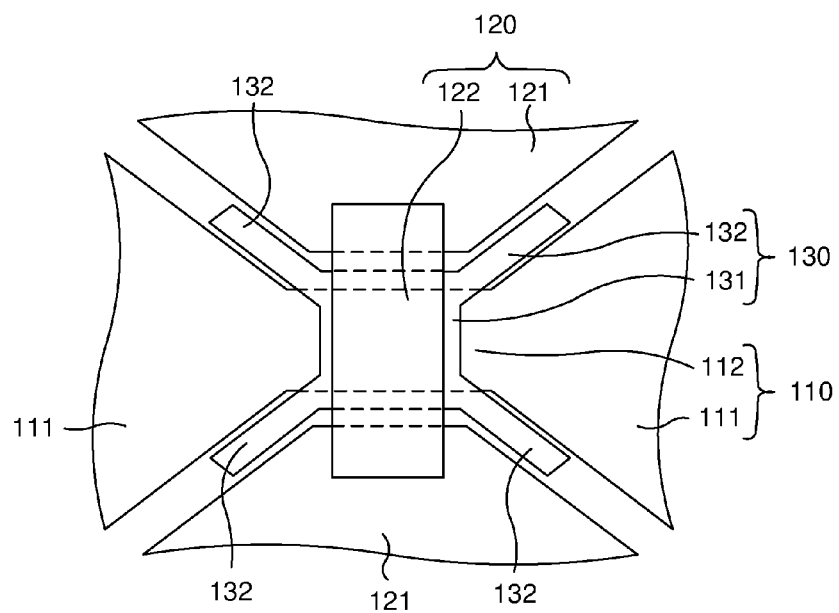
FIG. 2 is an enlarged drawing of the circle shown in FIG. 1.

Please refer to FIG. 2, each first electrode 110 includes a plurality of first electrode blocks 111 and a plurality of first connection traces 112. Each second electrode 120 includes a plurality of second electrode blocks 121 and a plurality of second connection traces 122. A space is formed between each first electrode block 111 and the adjacent second electrode blocks 121, and each second connection trace 122 crosses a first connection trace 112. Each insulating block 130 includes a main portion 131 and at least one extending portion 132. The main portion 131 is disposed between each first connection trace 112 and each second connection trace 122, to electrically isolate the first connection trace 112 and the second connection trace 122 from each other. The area of each main portion 131 is larger than the area of the cross intersection of each first connection trace 112 and each second connection trace 122, and each main portion 131 does not overlap with the first electrode blocks 111 or the second electrode blocks 121 at all. The extending portion 132 extends from the main portion 131 to the space between the first electrode block 111 and the adjacent second electrode blocks 121. The first electrode blocks 111, the first connection traces 112 and the second electrode blocks 121 are disposed on a same surface, and the second connection traces 122 crosses over the insulating block 130, to electrically connect two adjacent second electrode blocks 121 along the second direction.

In this embodiment, since the insulating block 130 further comprises the extending portion 132, the force damages from outside may damage the extending portion 132 rather than the main portion 131, thereby decreasing the possibility to directly damage the main portion 131, and further decreasing the flaking possibility of the main portion 131 disposed between each first connection trace 112 and each second connection trace 122, and preventing the shorting problems between the first connection trace 112 and the second connection trace 122.

As shown in FIG. 1, the extending portion 132 extends from the main portion 131 toward four different directions, and extending to the peripheral spaces between the first electrode block 111 and the adjacent second electrode blocks 121. The extending portion 132 can withstand force damages from different directions simultaneously. In fact, the shapes of the extending portion 132 can be adjusted according to actual requirements, for example, the extending portion 132 can extend towards only one direction, or to many different directions simultaneously. The description is also applicable to others embodiment of the present invention which are mentioned in the following paragraphs, and will not be redundantly described.

Figure 3:
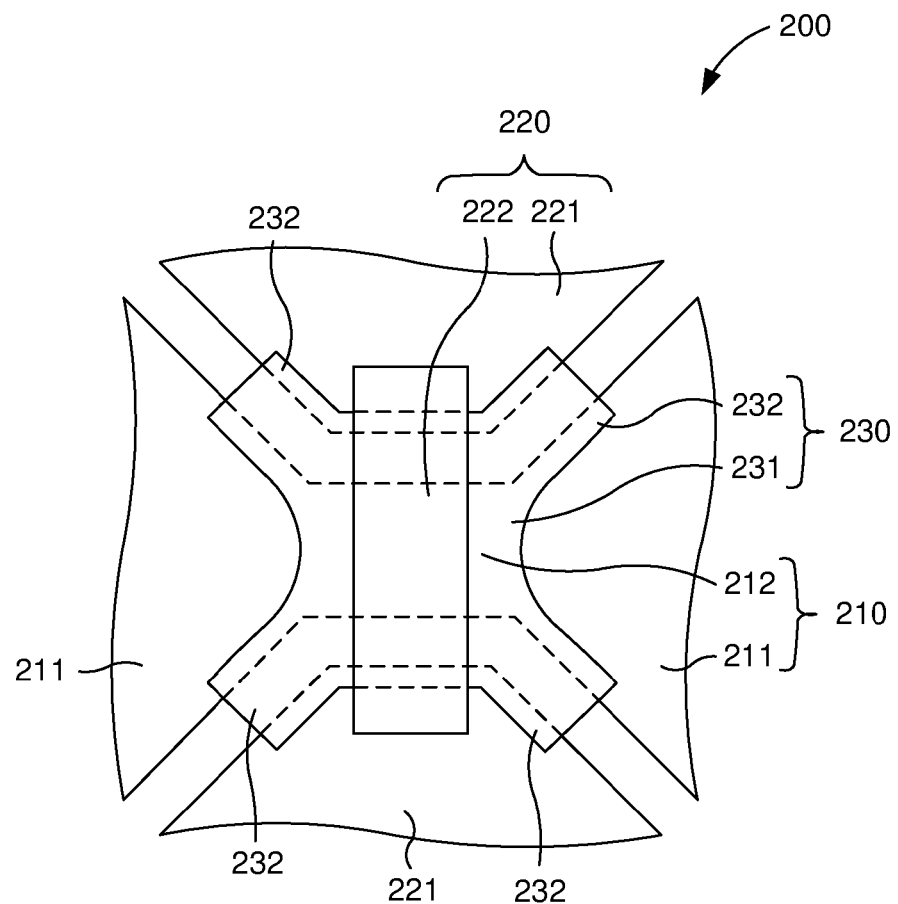
FIG. 3 is a top view diagram showing the touch panel according to a second preferred embodiment of the present invention.

FIG. 3 is a top view diagram showing the touch panel according to a second embodiment of the present invention. In order to clearly disclose the features of the present invention, FIG. 3 only shows the partially enlarged diagram, in particular, showing the intersection region of the electrodes arranged along different directions. But it can be understood that the actual touch panel can comprise a plurality of electrodes, and the size of each electrode can be adjusted according to actual requirements.

As shown in FIG. 3, a touch panel 200 comprises at least one first electrode 210 arranged along a first direction (such as X-axis), at least one second electrode 220 arranged along a second direction (such as Y-axis), and an insulating block 230.

Each first electrode 210 includes a plurality of first electrode blocks 211 and a plurality of first connection traces 212 electrically connected to the two adjacent first electrode blocks 211. Each second electrode 220 includes a plurality of second electrode blocks 221 and a plurality of second connection traces 222 electrically connected to the two adjacent second electrode blocks 221. A space is formed between each first electrode block 211 and the adjacent second electrode blocks 221, and each second connection trace 222 crosses a first connection trace 212. Each insulating block 230 includes a main portion 231 and at least one extending portion 232, the main portion 231 is disposed between each first connection trace 212 and each second connection trace 222, to electrically isolate the first connection trace 212 and the second connection trace 222 from each other. Besides, the main portion 231 partially overlaps the first electrode blocks 211 and the second electrode blocks 221. The extending portion 232 extends from the main portion 231 to the space between the first electrode block 211 and the adjacent second electrode blocks 221, and partially overlaps the adjacent first electrode blocks 211 and the adjacent second electrode blocks 221. The first electrode blocks 211, the first connection traces 212 and the second electrode blocks 221 are disposed on a same surface, and the second connection traces 222 crosses over the insulating block 230, to electrically connect two adjacent second electrode blocks 221 along the second direction.

In this embodiment, the insulating block 230 entirely or partially covers the first connection trace 212, and the edge of the insulating block 230 partially overlaps the first electrode blocks 211 and the second electrode blocks 221. Therefore, the edge of the insulating block 230 is larger than the range of the first electrode blocks 211 and the second electrode blocks 221, and parts of the insulating block 230 are directly disposed on the substrate. Since the insulating block 230 has better attachment with the substrate than with the first electrode blocks 211 or the second electrode blocks 221, the attachment makes the insulating block 230 stronger, helping the insulating block 230 to withstand more force damages from outside, thereby avoiding the shorting problems between the first electrodes 210 and the second electrodes 220.

Figure 4:
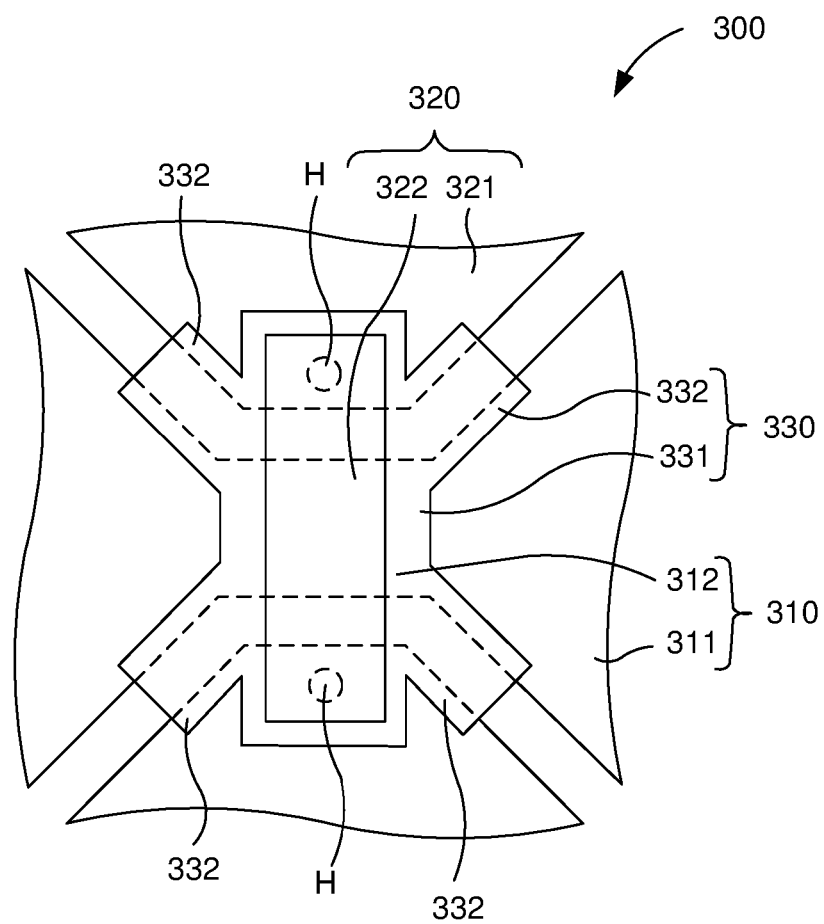
FIG. 4 is a top view diagram showing the touch panel according to a third preferred embodiment of the present invention.

FIG. 4 is a top view diagram showing the touch panel according to a third embodiment of the present invention. In order to clearly disclose the features of the present invention, FIG. 4 only shows the partially enlarged diagram, in particular, showing the intersection region of the electrodes arranged along different directions. But it can be understood that the actual touch panel can comprise a plurality of electrodes, and the size of each electrode can be adjusted according to actual requirements.

As shown in FIG. 4, a touch panel 300 comprises at least one first electrode 310 arranged along a first direction, at least one second electrode 320 arranged along a second direction, and an insulating block 330. Each first electrode 310 includes a plurality of first electrode blocks 311 and a plurality of first connection traces 312. Each second electrode 320 includes a plurality of second electrode blocks 321 and a plurality of second connection traces 322. A space is formed between each first electrode block 311 and the adjacent second electrode blocks 321, and each second connection trace 322 crosses a first connection trace 312. Each insulating block 330 includes a main portion 331 and at least one extending portion 332, the main portion 331 is disposed between each first connection trace 312 and each second connection trace 322, to electrically isolate the first connection trace 312 and the second connection trace 322 from each other, and the two terminals of the main portion 331 partially overlap the adjacent second electrode blocks 321. Besides, a plurality of via holes H are formed within the contacted region of the main portion 331 and the second electrode blocks 321. The extending portion 332 extends from the main portion 331 to the space between the first electrode block 311 and the adjacent second electrode blocks 321, and partially overlaps the adjacent first electrode blocks 311 and the adjacent second electrode blocks 321. The first electrode blocks 311, the first connection traces 312 and the second electrode blocks 321 are disposed on a same surface, and each second connection traces 322 is electrically connected to two adjacent second electrode blocks 321 through the via holes H along the second direction.

Figure 5:
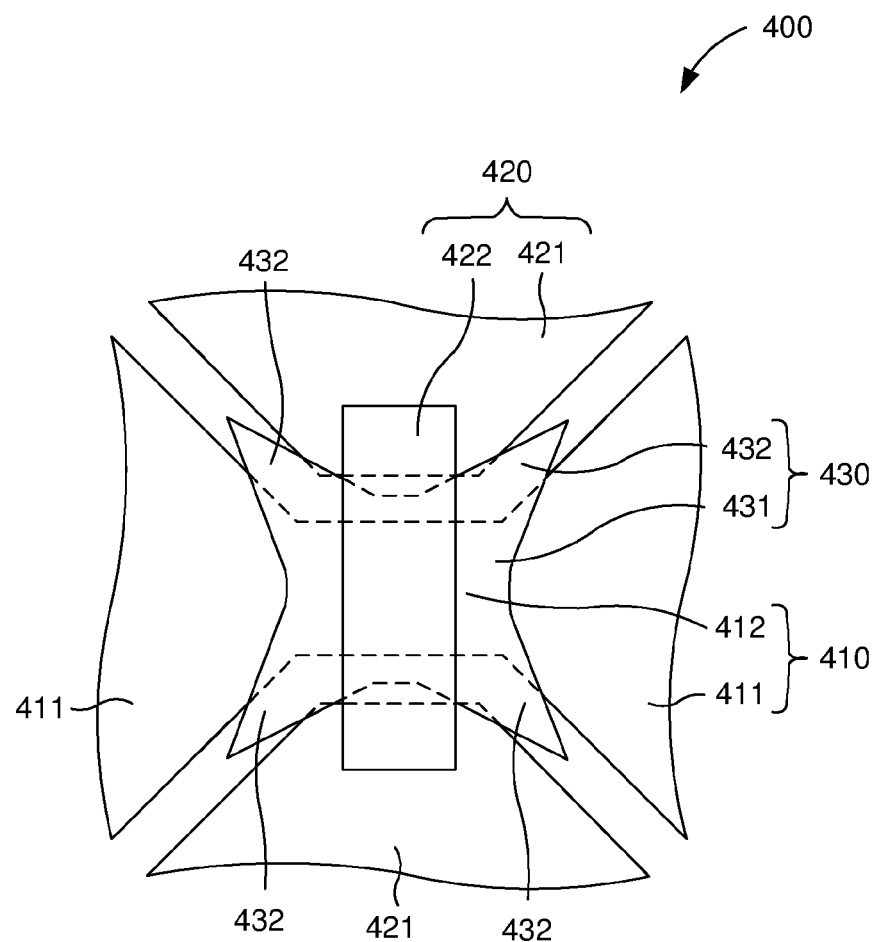
FIG. 5 is a top view diagram showing the touch panel according to a fourth preferred embodiment of the present invention.

FIG. 5 is a top view diagram showing the touch panel according to a fourth embodiment of the present invention. In order to clearly disclose the features of the present invention, FIG. 5 only shows the partially enlarged diagram, in particular, showing the intersection region of the electrodes arranged along different directions. But it can be understood that the actual touch panel can comprise a plurality of electrodes, and the size of each electrode can be adjusted according to actual requirements.

As shown in FIG. 5, a touch panel 400 comprises at least one first electrode 410 arranged along a first direction, at least one second electrodes 420 arranged along a second direction, and an insulating block 430. Each first electrode 410 includes a plurality of first electrode blocks 411 and a plurality of first connection traces 412 electrically connected to the adjacent first electrode blocks 411. Each second electrode 420 includes a plurality of second electrode blocks 421 and a plurality of second connection traces 422 electrically connected to the adjacent second electrode blocks 421. A space is formed between each first electrode block 411 and the adjacent second electrode blocks 421, and each second connection trace 422 crosses a first connection trace 412. Each insulating block 430 includes a main portion 431 and at least one extending portion 432, the main portion 431 is disposed between each first connection trace 412 and each second connection trace 422, to electrically isolate the first connection trace 412 and the second connection trace 422 from each other, and the two terminals of the main portion 431 partially overlap the adjacent second electrode blocks 421. The extending portion 432 extends from the main portion 431 to the space between the first electrode block 411 and the adjacent second electrode blocks 421, and the end terminal of the extending portion 432 is sharped-shaped. The first electrode blocks 411, the first connection traces 412 and the second electrode blocks 421 are disposed on a same surface, and the second connection trace 422 crosses over the insulating block 430 and is electrically connected two adjacent second electrode blocks 421 along the second direction.

In this embodiment, the end terminals of the extending portion 432 are sharped-shaped, which can disperse the force damages from outside more effectively, and decrease the force damages to the insulating block 430.

In those embodiments mentioned above, the touch panel further comprises a substrate, the material of the substrate can comprise transparent or opaque materials, and are not limited to rigid substrate or flexible substrate, such as glass, polycarbonate (PC), polyethylene terephthalate (PET), polymethylmesacrylate (PMMA), polysulfone (PES) or cyclic olefin copolymer. The substrate is used for loading and protecting the components disposed on the substrate, such as the first electrode blocks, the first connection traces or the second electrode blocks and other components.

In those embodiments mentioned above, the material of the first electrode block and the second electrode block can comprise transparent conductive materials, such as indium tin oxides (ITO), indium zinc oxide (IZO), aluminum zinc oxide (AZO), nano silver or carbon nano tube. The materials of the first connection trace and the second connection trace can comprise the transparent conductive materials mentioned above or metals such as gold, silver, copper or aluminum. The material of the insulating block can comprise smooth layers made of polymer, such as polyimide (PI), or inorganic materials such as silicon nitride ($Si_3N_4$) or silicon oxide ($SiO_2$). It can be understood that the materials mentioned above are not limited thereto. These materials can be replaced by other suitable materials with similar characteristics, and this should be comprised in the scope of the present invention.

It is noteworthy that the shape of the insulating block of the present invention is not limited to those in each embodiment mentioned above, for example, the insulating block of the present invention can be an asymmetry structure. Besides, the structure of the main portion and the extending portion can also be adjusted in according to actual requirements. The edge of the insulating block can be arc-shaped, zigzag-shaped or wavy-shaped, the present invention is not limited thereto.

The method for forming the touch panel mentioned above, at least comprising the following steps:

First, a plurality of first electrode blocks arranged along a first direction are formed, a plurality of first connection traces electrically are formed and connecting to two adjacent first electrode blocks along the first direction, and a plurality of second electrode blocks are formed, arranged along a second direction, wherein the first electrode blocks and the first connection traces compose a plurality of first electrodes, a space is formed between each second electrode block and the adjacent first electrode blocks;

Next, a plurality of insulating blocks are formed, wherein each insulating block includes a main portion and at least one extending portion, the main portion is disposed on each first connection trace, the extending portion extends from the main portion to the space between the first electrode block and the adjacent second electrode blocks;

Afterwards, a plurality of second connection traces are formed on the insulating block, and are electrically connected to two adjacent second electrode blocks along the second direction, wherein the second electrode blocks and the second connection traces compose a plurality of second electrodes.

In one embodiment of the present invention, the method further comprises providing a substrate, the first electrode blocks, the first connection traces and the second electrode blocks are formed on the substrate.

In one embodiment of the present invention, wherein each second connection trace crosses over the insulating block, to electrically connect two adjacent second electrode blocks.

In one embodiment of the present invention, the method further comprises forming a plurality of via holes on each insulating block, and each second connection trace is electrically connected to two adjacent second electrode blocks through the via hole.

In the manufacturing method for forming the touch panel of the present invention, the electrode patterns (including the first electrode 110 and the second electrode blocks 121) are formed firstly, and the insulating blocks 130 are then formed. Afterwards, the jumpers (the second connection trace 122) are formed. However, the present invention is not limited thereto. The touch panel can be formed through an antinormal manufacturing process. More precisely, the jumpers (the second connection trace) can be formed firstly, and the insulating blocks are then formed, afterwards, the electrode patterns (including the first electrode 110 and the second electrode blocks 121) are formed.

In the present invention, only by changing the pattern of the photomask of the insulating block, and without any additional process, the shorting issues of two electrodes can be effectively resolved.

The feature of the present invention is that the insulating block comprises a main portion and at least one extending portion, the extending portion extends from the main portion to the space between two electrodes in different axes. Therefore, even though the edges of each insulating block is flaked caused by the force damages from outside, the insulating block can still electrically isolate the electrodes from each other, thereby avoiding the shorting problems between electrodes in different axes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
  a plurality of first electrodes arranged along a first direction and parallel to each other, wherein each first electrode comprises a plurality of first electrode blocks and a plurality of first connection traces and each first connection trace electrically connects to two adjacent first electrode blocks along the first direction;
  a plurality of second electrodes arranged along a second direction and parallel to each other, wherein each second electrode comprises a plurality of second electrode blocks and a plurality of second connection traces, each second connection trace electrically connects to two adjacent second electrode blocks along the second direction, a space is formed between each second electrode block and an adjacent first electrode block, and each second connection trace crosses a first connection trace; and
  a plurality of insulating blocks, wherein each insulating block comprises a main portion and at least one extending portion, the main portion is disposed between each first connection trace and each second connection trace to electrically isolate a first connection trace and a second connection trace between which the main portion is disposed, the at least one extending portion extends from the main portion into the space formed between the second electrode block and the adjacent first electrode block, and a sidewall of the at least one extending portion extends parallel to a sidewall of the second electrode block.

2. The touch panel of claim 1, wherein the first electrode blocks, the first connection traces and the second electrode blocks are disposed on a same surface, and the second connection traces are disposed on another surface.

3. The touch panel of claim 1, wherein an area of the main portion is larger than an area of an intersection where the first connection trace crosses a second connection trace.

4. The touch panel of claim 3, wherein the main portion does not overlap the first electrode blocks and the second electrode blocks at all.

5. The touch panel of claim 3, wherein the main portion partially overlaps adjacent first electrode blocks or adjacent second electrode blocks.

6. The touch panel of claim 3, wherein the main portion partially overlaps adjacent first electrode blocks and adjacent second electrode blocks.

7. The touch panel of claim 1, wherein each extending portion is entirely disposed within spaces between the first electrode blocks and the second electrode blocks.

8. The touch panel of claim 1, wherein each extending portion partially overlaps adjacent first electrode blocks and adjacent second electrode blocks.

9. The touch panel of claim 3, wherein each second connection trace crosses over an insulating block to electrically connect two adjacent second electrode blocks.

10. The touch panel of claim 5 or 6, wherein each insulating block comprises a plurality of via holes, and each second connection trace is electrically connected to two adjacent second electrode blocks through a via hole.

11. The touch panel of claim 1, further comprising a substrate, wherein the first electrode blocks, the first connection traces and the second electrode blocks are disposed on the substrate.

12. The touch panel of claim 1, wherein a material of the first electrodes and the second electrodes comprises indium tin oxide, indium zinc oxide, aluminum zinc oxide, nano silver or carbon nanotubes.

13. The touch panel of claim 1, wherein a material of the insulating blocks comprises polyimide, epoxy, silicon nitride or silicon dioxide.

14. A method for forming a touch panel, at least comprising:
  forming a plurality of first electrode blocks arranged along a first direction, a plurality of first connection traces electrically connecting to two adjacent first electrode blocks along the first direction, and a plurality of second electrode blocks arranged along a second direction, wherein the first electrode blocks and the first connection traces compose a plurality of first electrodes, and a space is formed between each second electrode block and an adjacent first electrode block;

forming a plurality of insulating blocks, wherein each insulating block comprising a main portion and at least one extending portion, the main portion is disposed on a first connection trace, the at least one extending portion extends from the main portion into the space formed between the second electrode block and the adjacent first electrode block, and a sidewall of the at least one extending portion extends parallel to a sidewall of the second electrode block; and forming a plurality of second connection traces on the insulating blocks and electrically connected to two adjacent second electrode blocks along the second direction, wherein the second electrode blocks and the second connection traces compose a plurality of second electrodes.

15. The method of claim 14, further comprising providing a substrate, wherein the first electrode blocks, the first connection traces and the second electrode blocks are formed on the substrate.

16. The method of claim 14, wherein each second connection trace crosses over an insulating block to electrically connect two adjacent second electrode blocks along the second direction.

17. The method of claim 14, further comprising forming a plurality of via holes on each insulating block, wherein each second connection trace is electrically connected to two adjacent second electrode blocks through via hole.

18. The method of claim 14, wherein a material of the first electrodes and the second electrodes comprises indium tin oxide, indium zinc oxide, aluminum zinc oxide, nano silver or carbon nanotubes.

19. The method of claim 14, wherein a material of the insulating blocks comprises polyimide, epoxy, silicon nitride or silicon dioxide.

* * * * *